Aug. 14, 1962 F. D. LAKINS ET AL 3,049,037
ADAPTER FOR BAR WORKING MACHINE
Filed Sept. 16, 1959 3 Sheets-Sheet 1

INVENTOR.
Franklin D. Lakins
Gerald B. Lanphere
BY
D. Emmett Thompson
ATTORNEY

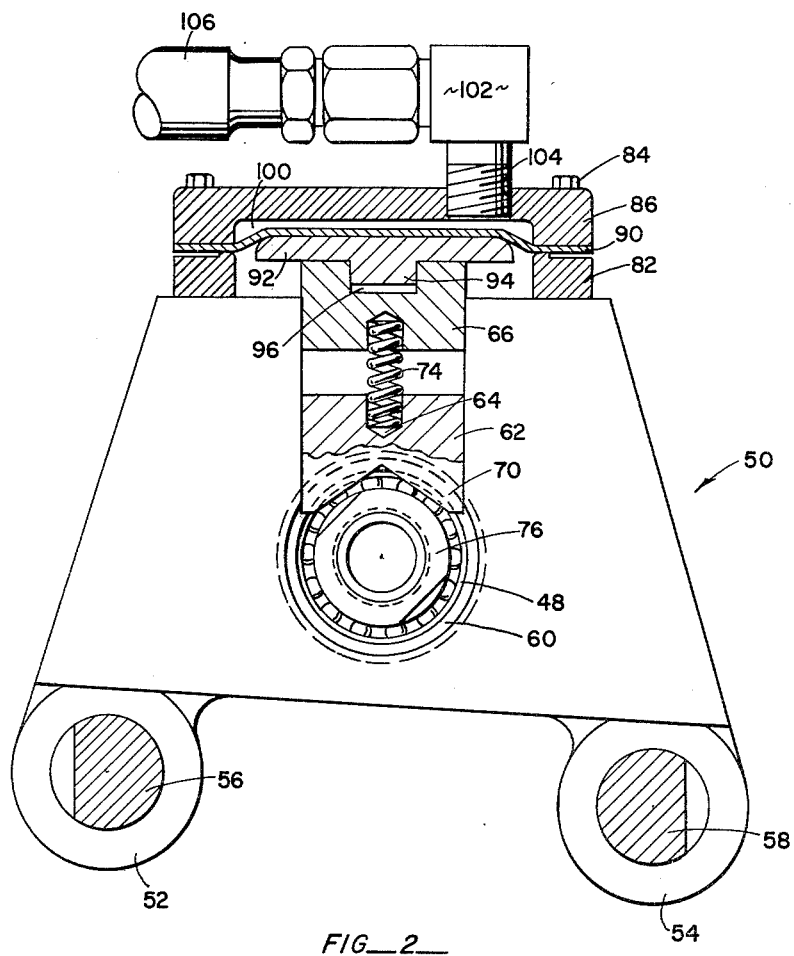
FIG_2_

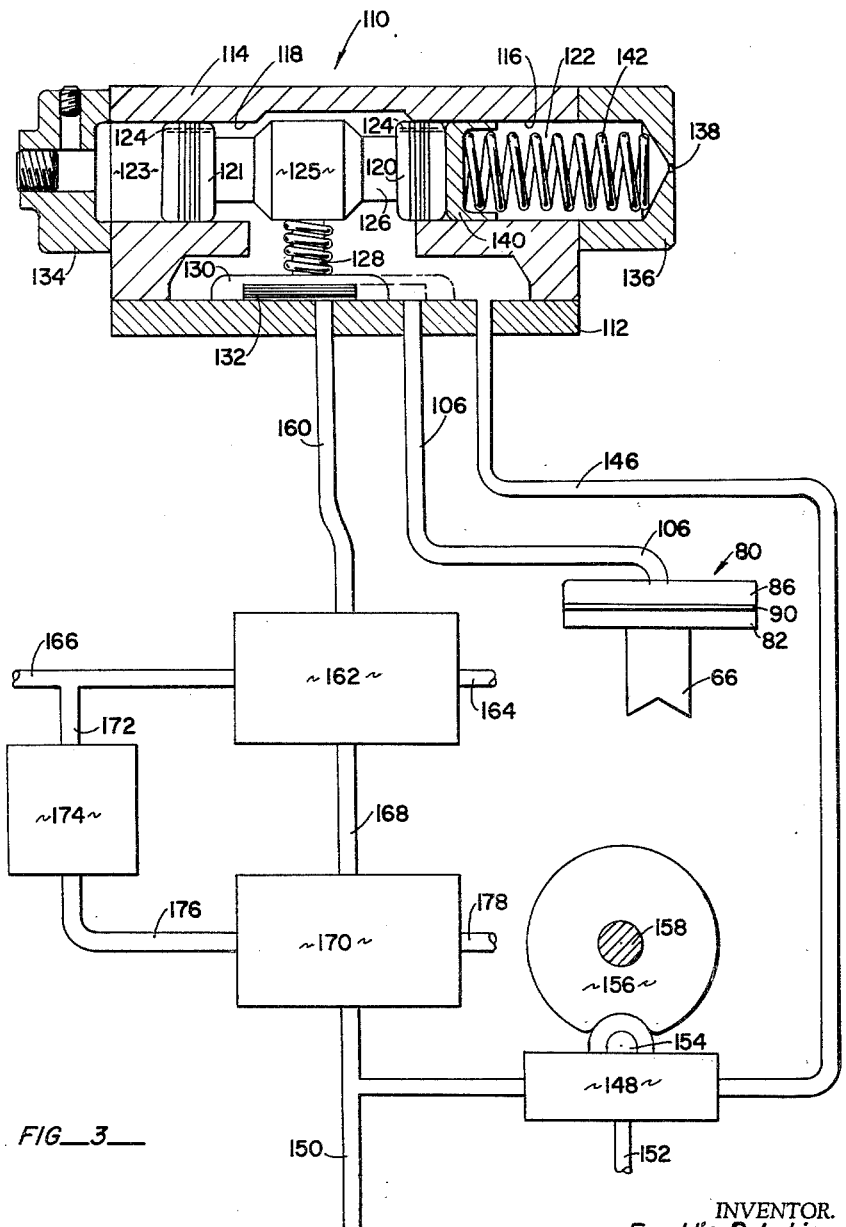

United States Patent Office 3,049,037
Patented Aug. 14, 1962

3,049,037
ADAPTER FOR BAR WORKING MACHINE
Franklin D. Lakins and Gerald B. Lanphere, Syracuse, N.Y., assignors to Lipe-Rollway Corporation, Syracuse, N.Y., a corporation of New York
Filed Sept. 16, 1959, Ser. No. 840,460
6 Claims. (Cl. 82—30)

This invention relates to an adapter to be used in connection with bar feeding machines set up to feed stock into bar working machines such as centerless grinders, or the like.

Certain present bar working machines rotate the bar stock at very high speeds, some of said machines rotating the stock at speeds of the magnitude of 10,000 r.p.m. When a stock bar feeding machine of the type disclosed in the patent to B. C. Harney No. 2,595,522 is set up to feed the bar stock into the bar working machine, the high speed at which the bar stock is being rotated causes the bar stock to bow or bend due to the centrifugal force caused by the high rotative speed. This bowing or bending of the bar stock sometimes causes that part of the bar stock which is bowed to engage the side wall of the bar feed machine guide tube with such a force that it is rendered impossible, or very difficult, to move the bar stock axially out of the bar feed guide tube during the feed-out cycle of the bar feed machine work cycle. Further, in high speed bar working machines, having a continuously rotating spindle and split collet, the bending or bowing of the bar stock may also take place within the spindle and collet causing the bar to engage the spindle and/or collet with a force which prevents the bar from being fed out through the spindle and collet during the feed-out cycle of the machine.

Accordingly, it is an object of this invention to provide an adapter to be used in connection with bar feeding and bar working machine set-ups wherein the adapter functions to permit the stock to be fed out of the bar working machine to and through the bar feeding machine regardless of the high speed at which the spindle of the bar working machine is being rotated.

More specifically, it is an object of this invention to provide a bar working machine having a continuously rotating spindle and collet with a spindle liner and brake operable to brake the liner to a halt during the feed-out cycle of the bar working machine.

In addition, it is a further object of this invention to provide a bar feeding and bar working machine set-up with an adapter for permitting the feed-out of bar stock and a control system for operating the adapter in timed relation to the feed-out cycle of the machines.

The invention consists in the novel features and in the combinations and constructions hereinafter set forth and claimed.

In describing this invention, reference is had to the accompanying drawings in which like characters designate corresponding parts in all the views.

In the drawings—

FIGURE 2 is a cross-sectional view taken looking in the direction of the arrows of line 2—2 of FIGURE 1.

FIGURE 3 is a diagrammatic illustration of the control system of the invention.

Figure 1:
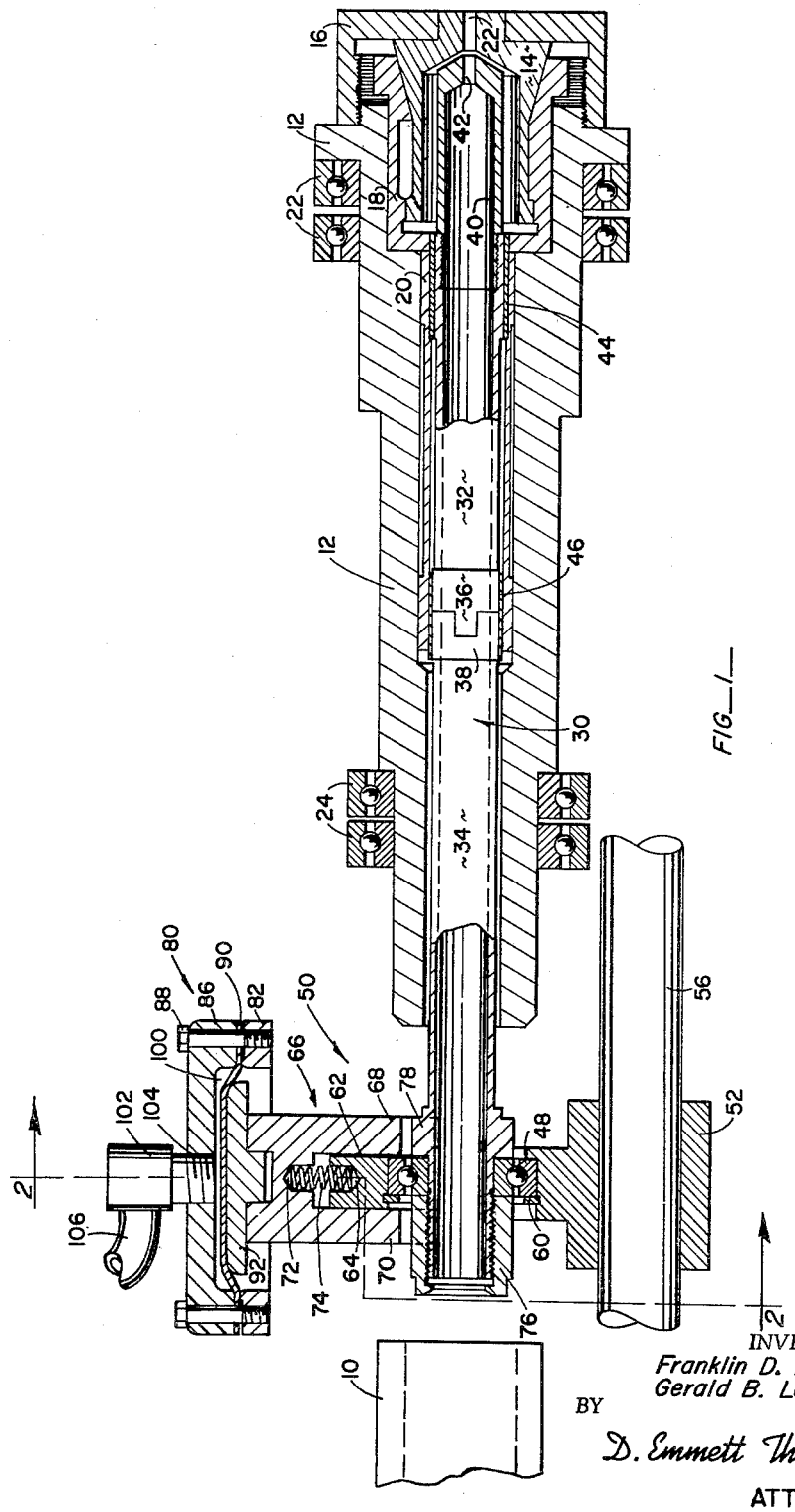
FIGURE 1 is a fragmentary elevational view with parts broken away and parts in section of the preferred embodiment of the invention.

Briefly described this invention comprises an adapter to be used in conjunction with a continuously rotating spindle of a high speed bar working machine. The adapter includes a liner mounted on bearings in the spindle of the bar working machine whereby the liner is free to rotate with the spindle. Adjacent the rear of the liner which extends outwardly from the rear of the spindle is a braking mechanism which functions, when operated, to brake the liner to a stop while the spindle continues to rotate thereby halting the rotation of the bar stock within the liner permitting the bar stock to be fed through the spindle and collet. The control system for actuating the braking mechanism functions to momentarily actuate the brake simultaneously with the collet opening of the bar working machine, whereby to eliminate the bowing or bending of the bar stock during a portion of the collet opening period, thus permitting the bar stock to be fed outwardly through the open collet.

Referring now to the drawings, the forward end of the bar feeding machine guide tube 10 is shown positioned in axial alignment with the spindle 12 of the bar working machine. The bar working machine is also provided with a split-jaw type collet 14 positioned in the forward end of the spindle 12, all of which is conventional. A collet nut 16 is fixed to the forward end of the spindle and a collet operating sleeve 18 is received between the collet 14 and the interior wall of the spindle 12. The sleeve 18 is reciprocated forwardly and rearwardly in the conventional manner by the collet operating tube 20 which abuts the rear end of the sleeve 18 to open and close the collet 14.

The collet 14 is provided with a center bore 22 which varies according to the diameter of the bar stock to be gripped by the collet 14. The spindle 12 is mounted for continuous high speed rotation on a pair of forward bearings 22 and a pair of rearward bearings 24 and means (not shown) are provided for actuating the collet tube 20 to open and close the collet 14.

Mounted within the spindle 12 is a liner, generally indicated by reference numeral 30. The liner comprises a forward portion 32 and a rearward portion 34 affixed together by a suitable tongue and groove connection 36, 38. A bushing 40 is threadedly affixed to the forward section 32 of the liner. As best seen in FIGURE 1, the bushing 40 is positioned immediately behind the jaws of the collet 14 and the bushing is provided with a bore 42 which is slightly larger than the diameter of the bar stock to be fed through the collet 14. In order to eliminate bar hang-up in the collet jaws, however, the bore 42 is smaller than the open diameter of the bore 22 of the collet. The rear section 34 of the liner extends rearwardly out of the spindle 12 for a purpose to be hereinafter described.

The forward section 32 of the liner is received in an anti-friction sleeve type bearing 44 and the tongue and groove connection 36, 38 between the liner sections 32, 34 is received within a second anti-friction sleeve type bearing 46. The rearward portion of the section 34, which extends out of the spindle 12, is journalled in a ball type anti-friction bearing 48, all whereby the liner 30 is free to rotate with the spindle 12.

The bearing 48 is mounted in a fitting, generally indicated at 50. The fitting 50 is formed with a pair of tubular eye portions 52, 54 which are received on the bar working machine, see FIGURE 2. The fitting 50 is formed with an aperture extending therethrough, the bottom portion of which is cylindrical in order to receive the bearing 48. The bearing 48 is retained within the aperture by means of a snap ring 60. The portion 62 of the fitting 50 forms the upper part of the aperture in which the bearing 48 is received and the portion 62 is provided with a bore 64.

A bifurcated braking member, generally indicated at 66, is mounted for vertical reciprocation on the fitting 50. The brake 66 is formed of any suitable braking material and is provided with a pair of legs 68 and 70 which are received on and guided by the upper portion 62 of the fitting 50. As best seen in FIGURE 1, the underside of the bifurcation is provided with a bore 72 which is in axial alignment with the bore 64 and a compression spring 74 is mounted with its ends received in the aligned bores 64 and 72 whereby the brake 66 is normally urged upwardly into the position shown in FIGURE 1.

The rear of the liner section 34 has a cylindrical braking member 76 threadedly mounted thereon on the rearward side of the bearing 48 and a second braking member 78 is integrally formed on the liner section 34 on the opposite side thereof, whereby when the brake 66 is urged into the braking position, the leg 70 of the brake engages the member 76 and the leg 68 engages the member 78 to brake the liner 30 to a halt within the rotating spindle 12.

The means for actuating the brake 66 comprises a diaphragm valve, generally indicated at 80. The diaphragm valve 80 comprises a lower ring 82 mounted on the fitting 50 by means of bolts 84. An upper cylindrical cover 86 is mounted on the lower ring 82 by means of a plurality of bolts 88 and the flexible diaphragm member 90 is received between the upper cover 86 and the lower ring 82. Positioned beneath the diaphragm member 90 is a movable member 92 formed with a boss 94 which is received in an aperture 96 formed on the upper side of the brake member 66, whereby, when the diaphragm 90 is moved downwardly the actuator 92 will cause the brake 66 to be moved downwardly against the opposition of the compression spring 74.

The diaphragm 90, together with the upper member 86 and the lower member 82, forms a closed compartment 100 into which fluid pressure is introduced to operate the diaphragm valve in the conventional manner by means of the fitting 102 threadedly received in an aperture 104 formed in the cover 86, and the fluid pressure line 106. As will be obvious, the introduction of fluid pressure into the compartment 100 through the line 106 and the fitting 102 will cause the diaphragm 90 and in turn the brake actuator 92 to move downwardly and upon exhaustion of the pressure from the compartment 100, the coil compression spring 74 will return the brake 66 to the position shown in FIGURES 1 and 2.

The control system for operating the diaphragm valve 80 to cause the brake 66 to halt the rotation of the liner 30 will now be described in connection with FIGURE 3. The line 106 of the diaphragm valve 80 is connected to a master control valve 110 which is normally in the position indicated by the solid line in FIGURE 3.

The valve 110 comprises a lower plate 112 and an upper casing 114. The casing 114 is formed with a pair of cylindrical bores 116 and 118 in which pistons 120 and 121 are received thereby forming cylinders 122 and 123, respectively. Each of the pistons 120, 121 is formed with a bleed hole 124 which enters into the cylinder within which the respective piston reciprocates. The pistons 120 and 121 are fixed to a center member 125 by arms 126 and the center piece 125 has a leg 128 depending therefrom. The leg 128 is affixed to a valve slide 130 formed on its underside with a chamber 132.

Cylinder 123 within which the piston 121 reciprocates is closed by an end plug 134, and cylinder 122 within which the piston 120 reciprocates is provided with an end cap 136 having an aperture 138 to bleed off any pressure leaking into the cylinder 122. A cylinder member 140 is provided in opposed relation to the cap 136, the member 140 serving to plug bleed hole 124 in piston 120 and a coiled compression spring 142 is received between the member 140 and the cap 136 to maintain member 140 in engagement with piston 120 and yieldingly urge the piston to the solid line position.

The valve 110 is provided with fluid pressure through a line 146 connected through a valve 148, which is normally closed, to a fluid pressure supply line 150. The valve 148 is of the three-way type and has an exhaust line 152 open to atmosphere and is also provided with an actuator 154. The actuator 154 is positioned in the path of movement of a rotating cam 156 mounted on a shaft 158.

The cam 156 and shaft 158 are mounted on the bar working machine and the shaft 158 is rotated simultaneously with the opening of the collet 14 to rotate the cam 156 through one revolution during the period of the collet opening. Upon actuation of the valve actuator 154 by the cam 156, pressure from line 150 is introduced into the valve 110 through line 146. The pressure entering the valve 110 is supplied to the diaphragm valve 80 through line 106 to actuate the brake 66 whereby to halt the rotation of the spindle liner 30 to permit the feed-out of the bar stock through the open collet 14, as previously described.

Simultaneous with the entrance of the pressure into the line 106 to actuate the brake 66, the pressure entering the valve 110 is bled through the aperture 124 of piston 121 to provide a pressure build-up within the cylinder 123. Upon sufficient pressure being built up within the cylinder 123, the entire valve slide is moved from the position shown in the solid lines to the position shown in the dotted lines, this movement taking place when the pressure build-up is sufficient to overcome force of the spring 142. This movement connects the line 106 to the line 160 through chamber 132 formed in the slide 130.

The line 160 enters a conventional three-way pilot operated valve 162 which is normally closed to connect the line 160 to the line 164 which is open to atmosphere thereby exhausting the pressure within the valve 80 to return the brake 66 to the upper inoperative position.

The operation above described takes place once during each bar working cycle to brake the liner 30 to a halt thus eliminating the centrifugal force in the bar stock caused by the high speed rotation of the bar stock thereby permitting the bar stock to be fed through the open collet 14.

Upon completion of the working of the bar stock, the collet of the bar working machine is opened and pressure is supplied to valve 110 to move the slide 130 to the position shown in the dashed lines in FIGURE 3. During the return movement of the bar feed pusher apparatus, pressure is supplied to line 166, as is described in the above-referred to patent. The pressure in line 166 enters the valve 162 and serves to operate the pilot of valve 162. Upon operation of the pilot of valve 162 the line 160 is connected through valve 162 to line 168 which is connected through a normally open three-way pilot operated valve 170 to the pressure supply line 150 thus operating the brake 66 during the period of time in which the stock pusher apparatus is being moved rearwardly in the bar feeding machine. The brake is applied during this period of time to permit the bar stock remnant to be removed from, or ejected from, the spindle and collet of the bar working machine.

After a predetermined period of time, selected according to the method of bar end remnant removal, pressure in line 166 is supplied through line 172 and timer 174 to line 176 which operates the pilot of valve 170. The timer 174 is set to operate to connect line 166 to valve 170 according to the method of bar end remnant ejection method used whereby upon completion of the period of time necessary to remove the remnant the timer 174 operates to connect the line 172 to the line 176.

The introduction of the pressure into the valve 170 through the line 172, timer 174 and line 176 from the line 166 operates to connect the line 168 to a line 178 which is open to atmosphere thereby exhausting the pressure on the diaphragm 90 of the diaphragm valve 80 through line 106, chamber 132, line 160, valve 162, line 168, valve 170 and line 178. This exhaustion of the pressure in the valve 80 thus releases the brake and permits the spindle liner 30 to rotate with the spindle 12.

The operation just described takes place only once during the working of each piece of bar stock and is provided in order to brake the liner during the bar end remnant removal, or ejection, operation. Thereafter, the system shown in FIGURE 3 operates as previously described to brake the liner 30 once during each bar working cycle to permit the feed-out of the bar stock.

As will be obvious, the invention hereinbefore described functions to eliminate the centrifugal force which causes the bar stock to bend or bow within the spindle and collet of the bar working machine, thus preventing the feed-out of the bar stock when the collet is open. This elimination of the centrifugal force is due to the braking of the spindle liner which thus relaxes or eliminates the bowing or bending of the bar stock and permits the feed-out of the bar stock through the open collet during the feed-out portion of the bar machining work cycle.

What we claim is:

1. A bar feed adapter for high-speed bar working machines having a work collet and spindle comprising a spindle liner journalled in said spindle, said liner extending into the rear of said collet and terminating adjacent the rear face of the jaws of said collet and having a bushing mounted in the end of said liner, means for braking said liner after said collet jaws are opened by said bar working machine, but while said collet and spindle are rotating at high speed to permit feed out of bar stock through said liner and bushing, said means being operable to brake said liner to a stop to permit said feed out.

2. In a high speed bar working machine having a continuously rotating spindle and work collet the improvement comprising, a spindle liner mounted for free rotation on a pair of bearings in said spindle, said spindle liner being provided at its collet end with a removable bar stock receiving bushing, a brake means for periodically halting the rotation of said liner while said spindle is rotating and said collet is open to permit feed-out of bar stock through said liner, bushing, and said collet, and control means for actuating said brake means in timed relation with the opening and closing of said collet.

3. Claim 2, wherein said brake means comprises a brake shoe operable upon actuation to engage said spindle liner to halt rotation of said liner.

4. Claim 2, wherein said control means comprises a fluid circuit including a supply line connected to a source of pressure fluid, a valve mounted in said supply line operable when actuated to introduce said pressure fluid into a brake shoe actuator through a master control valve, said master control valve exhausting the pressure to said brake actuator after a predetermined period of time, whereby to momentarily actuate said brake shoe.

5. A bar working machine attachment for preventing bar hang-up during the feed-out cycle of high speed bar working machines having a continuously rotating spindle and collet comprising a spindle liner mounted for free rotation in said spindle, the collet end of said liner being provided with a bushing having a bore slightly larger than the bar stock diameter to be fed through said spindle and collet and brake means provided adjacent the rearward end of said liner and being operable upon actuation by control means to momentarily halt the rotation of said spindle liner to permit bar feed-out and said control means operating in timed relation to the opening of said collet to halt rotation of said liner simultaneously with the opening of said collet.

6. A bar working machine attachment for preventing bar hang-up during the feed-out cycle of high speed bar working machines having a continuously rotating spindle and collet, comprising a spindle liner journalled in said spindle, the collet end of said liner being formed with a bore slightly larger than the bar stock diameter to be fed through said bar working machine and brake means provided adjacent the rearward end of said liner and being operable upon operation to momentarily halt the rotation of said spindle liner to permit said bar stock to be fed through said liner.

References Cited in the file of this patent

UNITED STATES PATENTS

| 1,273,775 | Haas et al. | July 23, 1918 |
| 2,417,936 | Klema et al. | Mar. 25, 1947 |
| 2,843,974 | Butterworth | July 22, 1958 |

FOREIGN PATENTS

| 897,037 | Germany | Nov. 16, 1953 |